UNITED STATES PATENT OFFICE.

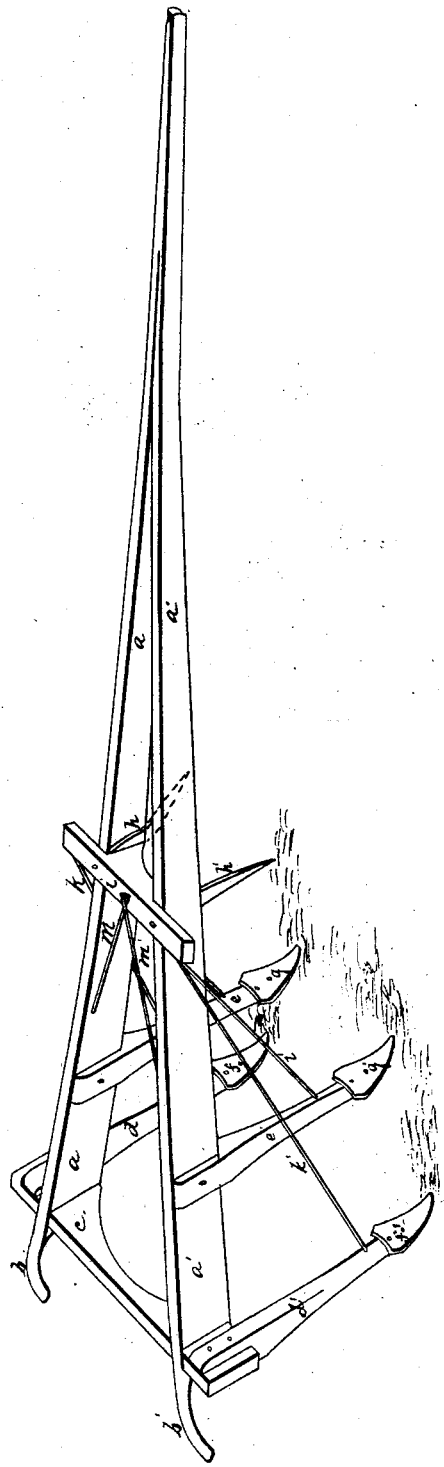

JOB BROWN, OF LAWN RIDGE, ILLINOIS.

IMPROVEMENT IN CULTIVATORS.

Specification forming part of Letters Patent No. 11,929, dated November 14, 1854.

*To all whom it may concern:*

Be it known that I, JOB BROWN, of Lawn Ridge, county of Marshall, and State of Illinois, have invented a new and useful Improvement in Cultivators; and I do hereby declare that the following is a full and exact description thereof.

The nature of my invention consists in forming the side frames of the cultivator into a triangular shape, the forward ends of the frame being joined, so as to compose a tongue to which the animals are attached, and the after ends of the same terminating in handles by which the operator controls the implement.

To enable others skilled in the art to make and use my invention, I will proceed to describe its construction and operation, reference being had to the annexed drawing, forming a part of this specification, in which Figure 1 is a perspective view of my improvement.

Similar letters refer to like parts.

$a\ a'$ represent the side frame; $b\ b'$, handles; $c$, end piece; $d\ d'\ e e'$, standards; $f f'\ g g'$, plowshares; $h\ h'$, short standards; $i$, cross-piece; $k\ k'\ l\ l'$, standard-braces; $m\ m'$, frame-braces.

The two pieces $a$ and $a'$ of side frame, $a\ a'$, unite at the forward end of the machine into one piece and form a tongue to which the animals are attached, the whiffletrees being fastened to the cross-piece $i$. The after ends of the frame-pieces $a\ a'$ terminate in handles $b\ b'$, by means of which the operator guides and controls the implement.

The end piece, $c$, separates the handles and gives additional strength to the frame. The standards $d\ d'$ are attached to the end piece, $c$. They are steadied by the braces $k\ k'$, which extend from the lower parts of the standards to the cross-piece $i$. The standards $e\ e'$ are attached to the frame $a\ a'$, being steadied by the braces $l\ l'$. The cross-piece $i$ is held in its place by the braces $m\ m'$. All the standards are furnished with plowshares, except the short standards, indicated respectively by $f f'\ g g'$. The standard $d$ being attached to the end piece, $c$, and the standard $e$ being placed farther inward and attached to the frame $a$, space is left between the plows, so that they will cut on both sides of the drill of plants, but not injure the plants themselves. The two other plowshares are arranged in the same manner, so that two drills may be cultivated, each on both sides at the same time.

The short standards $h\ h$ turn the leaning stalks into the row.

The standards are intended to be long enough to elevate the frame so much that the tongue shall be of suitable height for the animals employed in drawing the machine.

By having the frame and tongue all in one piece stiffness and stability is given to the implement, and the operator has a thorough control over the same. By separating the after portion of the frame into angular shape and having the plowshares attached to the end piece and frame the central portions of the implement are left entirely open, which enables the operator to observe with certainty the action of the plowshares, and thus to do skillful work.

My machine possesses the further advantages of great simplicity and cheapness in construction.

Having thus described my invention, I claim—

The combination of the angular-shaped frame $a\ a'$ (having the two pieces $a$ and $a'$ united at their forward ends into a tongue) with the long standards $d\ d'\ e\ e'$ and short standards $h\ h'$, in the manner and for the purposes herein set forth.

JOB BROWN.

Witnesses:
CHARLES STONE,
JNO. E. LEVY.